United States Patent
Dekoning

(10) Patent No.: US 8,727,108 B2
(45) Date of Patent: May 20, 2014

(54) BELT CONVEYOR FOR OILSEEDS

(76) Inventor: Adrianus Dekoning, Eden (CA)

( * ) Notice: Subject to any disclaimer, the term of this patent is extended or adjusted under 35 U.S.C. 154(b) by 12 days.

(21) Appl. No.: 13/471,303

(22) Filed: May 14, 2012

(65) Prior Publication Data

US 2012/0285795 A1    Nov. 15, 2012

(51) Int. Cl.
*B65G 15/08*    (2006.01)
*B65G 21/00*    (2006.01)
*B65G 19/18*    (2006.01)

(52) U.S. Cl.
USPC ............. 198/818; 198/860.4; 198/735.4; 198/311; 198/550.4

(58) Field of Classification Search
USPC ......... 198/311, 540, 544, 547, 550.4, 550.13, 198/808, 818, 819, 820, 823, 824, 860.4, 198/735.4, 494
See application file for complete search history.

(56) References Cited

U.S. PATENT DOCUMENTS

| | | | | |
|---|---|---|---|---|
| 4,058,199 A * | 11/1977 | Schlagel | ........................ | 198/359 |
| 5,007,528 A * | 4/1991 | Hideharu | ........................ | 198/823 |
| 5,052,545 A * | 10/1991 | Gongen | ........................ | 198/534 |
| 6,349,812 B1 * | 2/2002 | Epp et al. | ........................ | 198/318 |
| 6,360,878 B1 * | 3/2002 | Deal et al. | ........................ | 198/819 |

* cited by examiner

*Primary Examiner* — Leslie A Nicholson, III
(74) *Attorney, Agent, or Firm* — Nixon & Vanderhye P.C.

(57) ABSTRACT

A belt conveyor apparatus includes a tube sloping from a hopper at the lower intake. A belt passes along a floor of the hopper then up through the tube. The hopper floor has edge portions curving upward such that as the belt moves along the floor, side portions of the belt curve upward. Hopper sidewalls extend upward and outward from bottom inner edges thereof located above right and left sides of the middle portion of the belt, and outer edges of the belt are thus located under the sidewalls. Seal strips are to the sidewalls with lower edges sealing to right and left sides of the middle portion of the belt such that pockets are formed under the sidewalls between the curved side portions of the belt and the seal strips. A trap opening in the tube also allows oilseeds to drop out of the tube from under the belt.

19 Claims, 2 Drawing Sheets

BELT CONVEYOR FOR OILSEEDS

This application claims the benefit of Canada Patent Application Serial No. 2,740,268, filed May 13, 2011, the entire contents of which is hereby incorporated by reference in its entirety.

This invention is in the field of conveyors and in particular belt conveyors for conveying agricultural products, particularly oilseeds such as canola and flax.

BACKGROUND

Belt conveyors are used in a wide range of applications for transporting both individual packages and granular material such as grain, ore, gravel, and the like. Such belt conveyors typically comprise a top conveying run on which the load is placed, and a bottom return run. The ends of the belt are connected together by a belt lace or like device to form an endless belt mounted on end rollers at each end of the belt conveyor.

Typically belt conveyors for granular material have outer edges of the belt on the top conveying run raised to form a trough to retain the material on the belt. The top conveying run may be supported in the troughed configuration by rollers or plates, and in many applications, particularly for conveying agricultural products, the conveying run passes through a tube that supports it in the troughed configuration. At the ends of the conveyor, the belt moves to a flat orientation as it passes over the end rollers, and typically the return run is flat and is supported by idler rollers, plate sections or the like spaced at suitable intervals under the conveyor.

The mechanisms used to drive the belt will vary depending on the conveyor length, load, configuration, and like conditions. In a simple configuration, a motor can be used to drive one of the end rollers of the conveyor. Friction between the belt and drive roller causes the belt to move with the surface of the roller. Where increased force is required to drive the belt because of long length, high load, or the like, the return run typically passes through an S-drive mounted under the conveyor. In the S-drive, idler rollers cause the belt to wrap farther around the drive roller, increasing the frictional force between the belt and drive roller and allowing more power to be transferred from the drive roller to the belt.

A typical portable conveyor for agricultural products will be mounted in a frame supported on wheels and include an actuator operative to raise and lower an upper output end of a conveyor tube while the lower intake end stays near the ground to receive agricultural products to be carried up the conveyor and discharged into the top of a grain bin. The lower receiving end typically includes a metal hoppered intake section where the belt runs flat before passing into the tube and moving to the curved orientation inside the tube. In this flat portion the edges of the belt may be curved up somewhat, and there will be a seal strip, typically a stiff rubber strip, fastened along a top edge thereof to the walls of the hopper such that the lower edge thereof bears against the belt and keeps the granular material on the belt.

In belt conveyors for agricultural products, there is also often a hoppered intake portion pivotally attached to the bottom end of the conveyor. This portion is positioned more or less horizontally under the center discharge of a belly dump grain trailer for example. The top run of the belt then must run horizontal to the pivot axis then make an angle upward. The belt is under tension and will therefore tend to rise up at the pivot axis in response to that tension. In order to hold the belt down, it is common to provide an S-roller arrangement again whereby the belt passes from the front end of the hopper rearward over a roller at the pivot axis then forward again to another roller then rearward up the angled main conveyor portion.

A problem arises when conveying oilseeds such as canola or flax. The seeds tend to bounce around and gather under various portions of the belt and under the seal strip where they are crushed. The crushed oilseeds release oil which causes the belt to slip on the drive rollers, and the crushed seeds are very sticky and gummy and build up on the belt and rollers, under the seal strip, and in various other areas under and around the belt, fouling the mechanisms. This crushed gummy buildup must then be scraped off, a very laborious operation. A typical farm may have auger conveyors as well as belt conveyors and so farmers will often choose to use the auger conveyor to avoid contaminating the belt conveyor.

SUMMARY

It is an object of the present invention to provide a belt conveyor apparatus for oilseeds that overcomes problems in the prior art.

In a first embodiment the present invention provides a belt conveyor apparatus comprising a tube mounted on a frame supported on wheels, the tube sloping upward from a lower intake end to an upper discharge end, and a hopper extending from the lower intake end of the tube. A belt has an upper run passing along a floor of the hopper then up through the tube to the discharge end of the tube, and a lower run extending under the tube and hopper. The floor of the hopper has edge portions curving upward from a middle portion of the floor such that as the belt moves along the floor, corresponding side portions of the belt curve upward from a middle portion of the belt. Right and left sidewalls of the hopper extend upward and outward from bottom inner edges thereof located above right and left sides of the middle portion of the belt such that right and left outer edges of the belt are located under the corresponding right and left sidewalls. Right and left seal strips are fastened along upper edges thereof to corresponding sidewalls such that lower edges of the seal strips are in proximity to corresponding right and left sides of the middle portion of the belt, and such that right and left pockets are formed under the right and left sidewalls between the curved side portions of the belt and the seal strips.

In a second embodiment the present invention provides a belt conveyor apparatus comprising a tube mounted on a frame supported on wheels, the tube sloping upward from a lower intake end to an upper discharge end, and a hopper extending from the lower intake end of the tube. A belt has an upper run passing along a floor of the hopper then up through the tube to the discharge end of the tube, and a lower run extending under the tube and hopper. A trap opening in a bottom side of the tube is configured such that the upper run of the belt passes over the trap opening and such that granular material moving along the tube under the belt drops downward through the trap opening.

Thus oilseeds that escape under the seal strips are not crushed between the sidewalls of the hopper, the seal strips, and the belt as in the prior art, put are free to roll around in the pockets until they pass up into the tube section of the conveyor. The trap opening allows oilseeds that may have spilled up and over the edges of the belt and moved under the belt while in the tube to drop out of the tube instead of passing over the drive rollers and being crushed.

BRIEF DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE INVENTION

Figure 1:
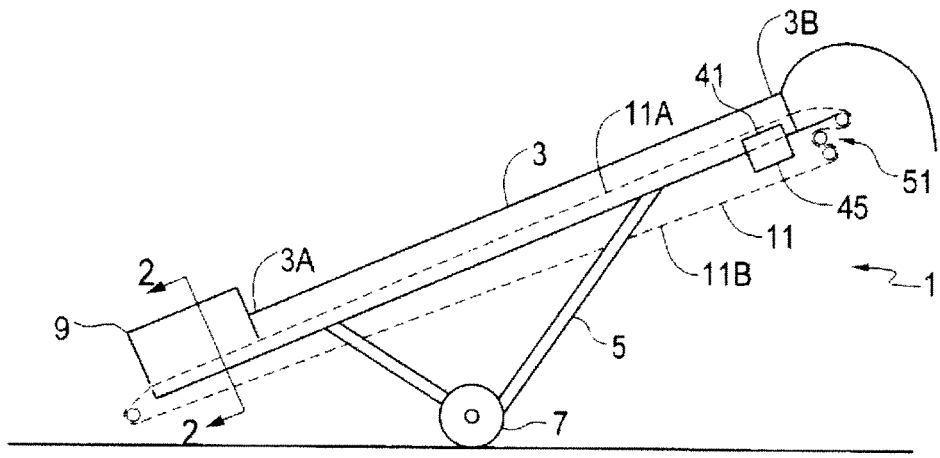
FIG. 1 is a schematic side view of an embodiment of a belt conveyor apparatus of the present invention.

FIG. 1 illustrates an embodiment of a belt conveyor apparatus 1 of the present invention. The apparatus 1 comprises a tube 3 mounted on a frame 5 supported on wheels 7. The tube 3 slopes upward from a lower intake end 3A to an upper discharge end 3B. A hopper 9 extends from the lower intake end 3A of the tube 3. A conveyor belt 11, shown in the drawings in dotted lines for clarity of illustration, has an upper run 11A passing along a floor 13 of the hopper 9 then up through the tube 3 to the discharge end 3B of the tube, and a lower run 11B extending under the tube 3 and hopper 9.

Figure 2:
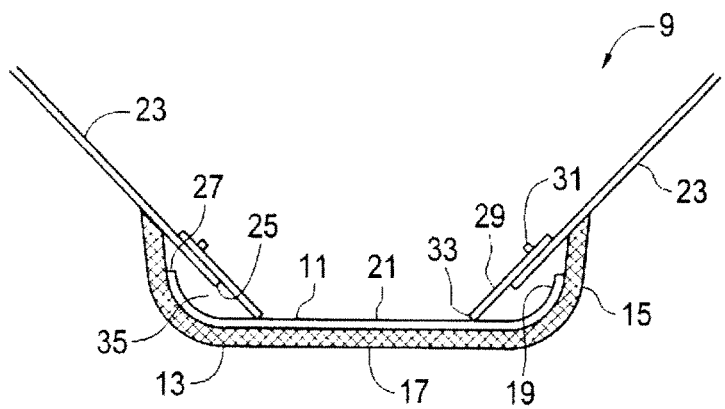
FIG. 2 is a schematic sectional view along line 2-2 in FIG. 1.

As schematically illustrated in FIG. 2, the floor 13 of the hopper has edge portions 15 curving upward from a middle portion 17 of the floor, which is substantially flat. Thus as the belt 11 moves along the floor 13, corresponding side portions 19 of the belt 11 curve upward from a middle portion 21 of the belt 11.

Right and left sidewalls 23 of the hopper 9 extend upward and outward from bottom inner edges 25 thereof located above right and left sides of the middle portion 21 of the belt such that right and left outer edges 27 of the belt 11 are located under the corresponding right and left sidewalls 23. In the illustrated hopper 9 the edge portions 15 of the floor 13 are fixed by welding or the like to bottom surfaces of the sidewalls 23 to form the hopper.

Right and left seal strips 29 are each fastened by fasteners 31 along an upper edge thereof to a corresponding sidewall 23 such that lower edges 33 of the seal strips 29 are in proximity to corresponding right and left sides of the middle portion 21 of the belt 11. The seal strips 29 will typically bear against the belt 11 to form a seal as is known in the art. The illustrated configuration thus forms right and left pockets 35 under the right and left sidewalls 23 between the curved side portions 19 of the belt 11 and the seal strips 29.

Figure 3:
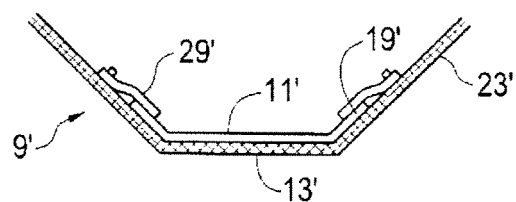
FIG. 3 is schematic sectional view of a belt conveyor hopper of the prior art.

In a typical conventional belt conveyor hopper as schematically illustrated in FIG. 3, the floor 13' is attached to the walls 23' of the hopper 9' and the side portions 19' of the belt 11' curve up on the sidewalls 23', and the seal strips 29' are fastened to the sidewalls 23' and over the outer edges of the belt 11'. During operation, small oilseeds such as canola and flax work there way up under the seal strips 29' and under the belt 11' and are crushed, fouling the belt, walls, and floor.

In contrast in the hopper 9 of the apparatus 1, as seen in FIG. 2, when oilseeds work under the lower edges 33 of the seal strips 29 they are free to roll around in the pockets 35 and move with the belt up into the tube 3 part of the conveyor. Gravity substantially prevents them from moving up over the side edges 27 of the belt 11, and they are not subjected to crushing forces while in the pockets 35.

Figure 4:
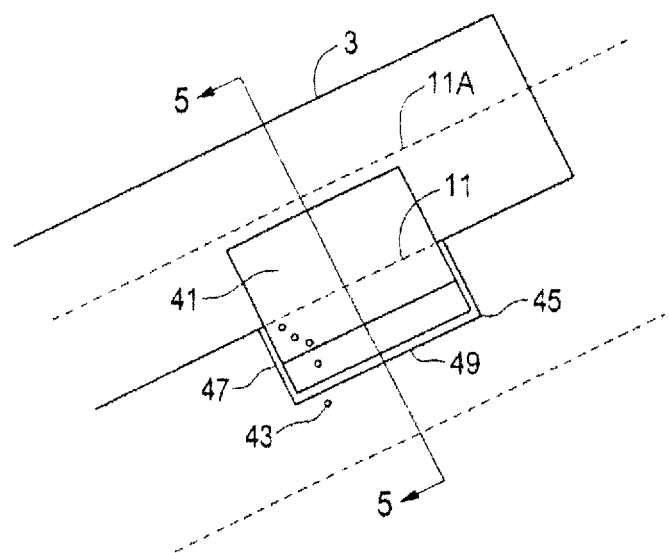
FIG. 4 is a schematic side view of the trap opening and deflector shield of the embodiment of FIG. 1.
Figure 5:
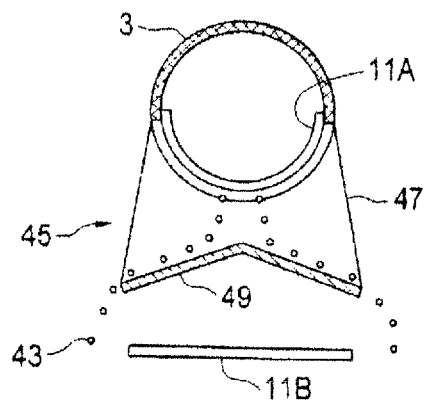
FIG. 5 is a schematic sectional view along line 5-5 in FIG. 4.

As illustrated in more detail in FIGS. 4 and 5, the illustrated apparatus 1 also includes a trap opening 41, a cut away portion in the bottom side of the tube 3 configured such that the upper run 11A of the belt passes over the trap opening 41 and any granular material, such as oil seeds 43, moving along the tube 3 under the belt 11 drops downward through the trap opening 41. A deflector shield 45 is positioned below the trap opening 41 and above the lower run 11B of the belt 11 is configured to direct oilseeds 43 dropping through the trap opening 41 laterally away from the lower run 11B of the belt 11.

The deflector shield 45 comprises trap side walls 47 extending downward from upper and lower edges of the trap opening 41, and a trap floor 49 above the lower run 11B of the belt 1. The trap floor 49 is sloped to direct the oilseeds 43 dropping through the trap opening 41 laterally away from the lower run 11B of the belt 11. The illustrated trap floor 49 is sloped to direct the material dropping through the trap opening 41 laterally to both right and left sides of the lower run 11B of the belt 11, but could also be simply sloped in one direction or the other. In the illustrated apparatus 1, the trap opening 41 is located in proximity to the drive roller arrangement 51 at the upper discharge end 3B of the tube 3, so that the underside of the belt 11 is clean when it passes over the drive rollers 51.

Figure 6:
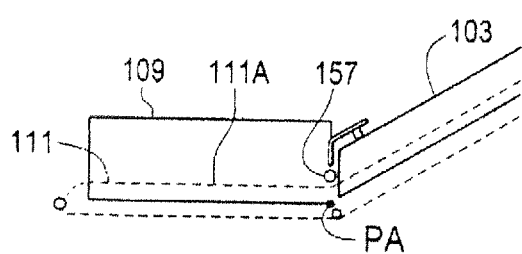
FIG. 6 is a schematic side view of a belt conveyor apparatus where the hopper is mounted at an upward angle with respect to the tube and using hold down wheels to keep the belt from rising at the transition from the hopper to the tube.
Figure 7:
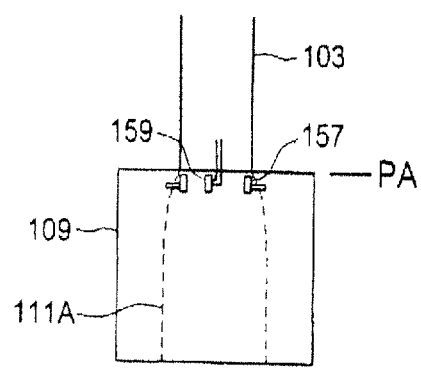
FIG. 7 is a schematic top view of the apparatus of FIG. 6.

FIGS. 6 and 7 schematically illustrate an alternate belt conveyor apparatus of the present invention where the hopper 109 extends from the lower intake end 103A of the tube 103 at an upward angle. The hopper 109 is pivotally attached to the lower intake end 103A of the tube 103 about a pivot axis PA such that the upward angle can be varied so the hopper can be maintained substantially horizontal while the upper discharge end of the tube 103 (not shown) moves up and down.

Figure 8:
FIG. 8 is a schematic side view showing an S-roller arrangement of the prior art used to keep the belt from rising at the transition from the hopper to the tube.

An S-roller arrangement 55, as schematically illustrated in FIG. 8, is commonly used to make the transition of the top run 11A of the belt through the angle from the hopper to the tube. These added rollers provide another opportunity for stray oilseeds to be crushed and create fouling problems.

Therefore in the apparatus of FIGS. 6 and 7 to make this angle transition, right and left hold down wheels 157 are rotatably mounted at the juncture of the tube 103 and the hopper 109 and are oriented such that right and left portions of the belt 111 pass under the corresponding right and left hold down wheels 157. A middle hold down wheel 159 can also be mounted such that the middle portion of the upper run 111A of the belt 111 runs under the middle hold down wheel 159. The hold down wheels 157, 159 keep the belt 111 from rising up in response to the tension thereon required to drive it. Some oilseeds will pass under the wheels and some of these will be crushed but it has been found that the damage is minimal and the arrangement works to reduce overall fouling due to crushed oilseeds.

Thus the present invention provides a belt conveyor with reduced fouling due to crushed oilseeds.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A belt conveyor apparatus comprising:
   a tube mounted on a frame supported on wheels, the tube sloping upward from a lower intake end to an upper discharge end;
   a hopper extending from the lower intake end of the tube;
   a belt with an upper run passing along a floor of the hopper then up through the tube to the discharge end of the tube, and with a lower run extending under the tube and hopper;
   wherein the floor of the hopper has edge portions curving upward from a middle portion of the floor such that as the belt moves along the floor, corresponding side portions of the belt curve upward from a middle portion of the belt;
   wherein right and left sidewalls of the hopper extend upward and outward from bottom inner edges thereof located above right and left sides of the middle portion of the belt such that right and left outer edges of the belt are located under the corresponding right and left sidewalls;
   right and left seal strips, each seal strip fastened along an upper edge thereof to a corresponding sidewall such that lower edges of the seal strips are in proximity to corresponding right and left sides of the middle portion of the belt, and such that right and left pockets are formed under the right and left sidewalls between the curved side portions of the belt and the seal strips.

2. The apparatus of claim 1 wherein the lower edges of the seal strips bear against the corresponding right and left sides of the middle portion of the belt.

3. The apparatus of claim 1 comprising a trap opening in a bottom side of the tube configured such that the upper run of the belt passes over the trap opening and such that granular material moving along the tube under the belt drops downward through the trap opening.

4. The apparatus of claim 3 further comprising a deflector shield below the trap opening and above the lower run of the belt and configured to direct material dropping through the trap opening laterally away from the lower run of the belt.

5. The apparatus of claim 4 wherein the deflector shield comprises trap side walls extending downward from upper and lower edges of the trap opening, and a trap floor above the lower run of the belt, the trap floor sloped to direct the material dropping through the trap opening laterally away from the lower run of the belt.

6. The apparatus of claim 5 wherein the trap floor is sloped to direct the material dropping through the trap opening laterally to one of a right side of the lower run of the belt, a left side of the lower run of the belt, and both right and left sides of the lower run of the belt.

7. The apparatus of claim 3 wherein the trap opening is located in proximity to a drive roller at the upper discharge end of the tube.

8. The apparatus of claim 1 wherein the hopper extends from the lower intake end of the tube at an upward angle and further comprising right and left hold down wheels rotatably mounted at the juncture of the tube and the hopper and oriented such that right and left portions of the belt pass under the corresponding right and left hold down wheels.

9. The apparatus of claim 8 further comprising a middle hold down wheel mounted such that the middle portion of the belt runs under the middle hold down wheel.

10. The apparatus of claim 8 wherein the hopper is pivotally attached to the lower intake end of the tube such that the upward angle can be varied.

11. A belt conveyor apparatus comprising:
    a tube mounted on a frame supported on wheels, the tube sloping upward from a lower intake end to an upper discharge end;
    a hopper extending from the lower intake end of the tube;
    a belt with an upper run passing along a floor of the hopper then up through the tube to the discharge end of the tube, and with a lower run extending under the tube and hopper;
    a trap opening in a bottom side of the tube configured such that the upper run of the belt passes over the trap opening and such that granular material moving along the tube under the belt drops downward through the trap opening; and
    a deflector shield below the trap opening and above the lower run of the belt and configured to direct material dropping through the trap opening laterally away from the lower run of the belt.

12. The apparatus of claim 11 wherein the deflector shield comprises trap side walls extending downward from upper and lower edges of the trap opening, and a trap floor above the lower run of the belt, the trap floor sloped to direct the material dropping through the trap opening laterally away from the lower run of the belt.

13. The apparatus of claim 12 wherein the trap floor is sloped to direct the material dropping through the trap opening laterally to one of a right side of the lower run of the belt, a left side of the lower run of the belt, and both right and left sides of the lower run of the belt.

14. The apparatus of claim 11 wherein the trap opening is located in proximity to a drive roller at the upper discharge end of the tube.

15. A belt conveyor apparatus comprising:
    a tube mounted on a frame supported on wheels, the tube sloping upward from a lower intake end to an upper discharge end;
    a hopper extending from the lower intake end of the tube;
    a belt with an upper run passing along a floor of the hopper then up through the tube to the discharge end of the tube, and with a lower run extending under the tube and hopper;
    a trap opening in a bottom side of the tube configured such that the upper run of the belt passes over the trap opening and such that granular material moving along the tube under the belt drops downward through the trap opening;
    wherein:
        the floor of the hopper has edge portions curving upward from a middle portion of the floor such that as the belt moves along the floor, corresponding side portions of the belt curve upward from a middle portion of the belt;
        right and left sidewalls of the hopper extend upward and outward from bottom inner edges thereof located above right and left sides of the middle portion of the belt such that right and left outer edges of the belt are located under the corresponding right and left sidewalls; and
        right and left seal strips are fastened along upper edges thereof to corresponding right and left sidewalls such that lower edges of the seal strips are in proximity to corresponding right and left sides of the middle portion of the belt, and such that right and left pockets are formed under the right and left sidewalls between the curved side portions of the belt and the seal strips.

16. The apparatus of claim 15 wherein the lower edges of the seal strips bear against the corresponding right and left sides of the middle portion of the belt.

17. The apparatus of claim 15 wherein the hopper extends from the lower intake end of the tube at an upward angle and further comprising right and left hold down wheels rotatably mounted at the juncture of the tube and the hopper and oriented such that right and left portions of the belt pass under the corresponding right and left hold down wheels.

18. The apparatus of claim 17 further comprising a middle hold down wheel mounted such that the middle portion of the belt runs under the middle hold down wheel.

19. The apparatus of claim 17 wherein the hopper is pivotally attached to the lower intake end of the tube such that the upward angle can be varied.

* * * * *